United States Patent [19]
Rao

[11] Patent Number: 5,896,165
[45] Date of Patent: Apr. 20, 1999

[54] METHOD AND SYSTEM FOR A VIDEO ANSWERING MACHINE

[75] Inventor: Kashipati G. Rao, Richardson, Tex.

[73] Assignee: Texas Instruments Incorporated, Dallas, Tex.

[21] Appl. No.: 08/838,661

[22] Filed: Apr. 9, 1997

[51] Int. Cl.$^6$ .................................................... H04N 7/14
[52] U.S. Cl. ............................ 348/14; 348/15; 379/93.21
[58] Field of Search ................................ 348/14, 15, 16, 348/17, 18

[56] References Cited

U.S. PATENT DOCUMENTS

| | | | |
|---|---|---|---|
| 5,018,186 | 5/1991 | Kimura et al. | 348/18 |
| 5,046,079 | 9/1991 | Hashimoto | 348/14 |
| 5,345,258 | 9/1994 | Matsubara et al. | 348/14 |
| 5,473,366 | 12/1995 | Imaeda et al. | 348/14 |
| 5,721,767 | 2/1998 | Bae et al. | 379/102.03 |

OTHER PUBLICATIONS

Nishino, ISDN composite terminal eqipment, JA 0311744, Dec. 1989.

*Primary Examiner*—Curtis A. Kuntz
*Assistant Examiner*—Melur Ramakrishnaiah
*Attorney, Agent, or Firm*—Robert L. Troike; Tammy L. Williams; Richard L. Donaldson

[57] ABSTRACT

The present invention is a video answer machine which includes a video data recorder (26) for accepting and recording an outgoing video message, an audio data recorder (22) for accepting and recording an outgoing audio message, and data storage (19) for storing said outgoing video message and said outgoing audio message. Also included in he video answering machine is a control module (12) for accepting an incoming call from a caller, for determining a device type associated with the incoming call, for responding to the incoming call using either the outgoing video message or the outgoing audio message in accordance with the associated device type and for accepting either an audio response or a video response from the caller in accordance with said associated device type.

6 Claims, 2 Drawing Sheets

METHOD AND SYSTEM FOR A VIDEO ANSWERING MACHINE

TECHNICAL FIELD OF THE INVENTION

This invention relates generally to data communications and more particularly to a method and for a video answering machine.

BACKGROUND OF THE INVENTION

Answering machines are extremely useful devices both in home and business settings. Although the functionality of answering machines have improved dramatically in recent years, due primarily to the digitization of many functions, improvements can still be made.

SUMMARY OF INVENTION

The present invention is a method and item for providing a video answering machine which includes a video data recorder for accepting and recording an outgoing video message, an audio data recorder for accepting and recording an outgoing audio message, and data storage for storing said outgoing video message and said outgoing audio message.

Also included in the video answering machine of the present invention is a control module for accepting an incoming call from a caller, for determining a device type associated with the incoming call, for responding to the incoming call using either the outgoing video message or the outgoing audio message in accordance with the associated device type and for accepting either an audio response or a video response from the caller in accordance with said associated device type.

DESCRIPTION OF THE DRAWINGS

These and other features of the invention that will be apparent to those skilled in the art from the following detailed description of the invention, taken together with the accompanying drawings

DETAILED DESCRIPTION OF THE INVENTION

Figure 1:
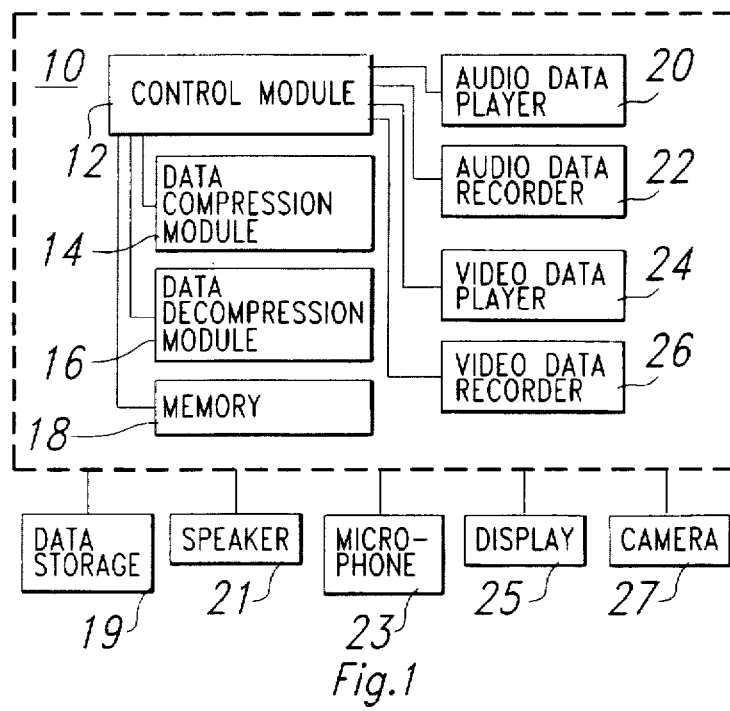
FIG. 1 is a block diagram illustrating a system in accordance with the present invention.

FIG. 1 shows a system in accordance with the present invention. As shown in FIG. 1, processor 10 includes a control module 12, a data compression module 14, a data decompression module 16, a memory 18, an audio data player 20, an audio data recorder 22, a video data player 24, and a video data recorder 26. Also connected to processor 10 is a data stow 19, a speaker 21, a microphone 23, a display 25 and a camera 27.

Although shown in FIG. 1 as separate components, it is contemplated that two or more of the components shown in FIG. 1 may be integrated into a single device. For example, it is contemplated that a video-capable device such as a video phone many be used to implement several of the functional components of the present invention in FIG. 1. It is also contemplated, for example, that a general purpose digital computer may be used to implement several of the functional components of the present invention as shown in FIG. 1. Those skilled in the art will readily understand other equivalents to the structure illustrated in FIG. 1.

Figure 2:
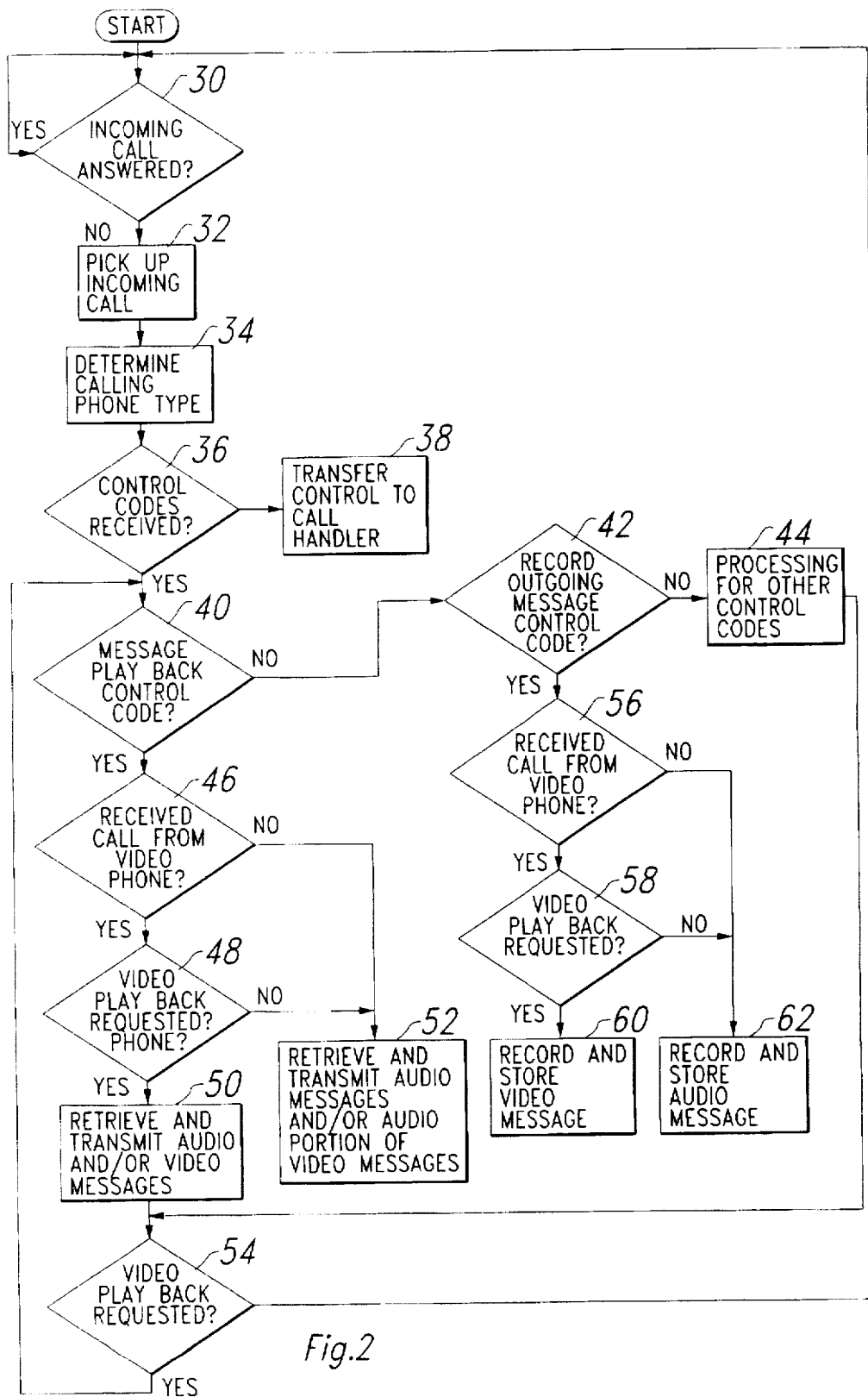
FIG. 2 is a flow diagram illustrating operation of a system in accordance with the present invention.

FIG. 2 illustrates operation of the control module 12 shown in FIG. 1. At decision block 30, if an incoming call is not answered, the control module 12 picks up the incoming call as shown at block 32. Then, at block 34, the controller module determines what type of device the incoming call is received from. It is contemplated, for example, that some type of identifying signal is transmitted from the device.

Figure 3:
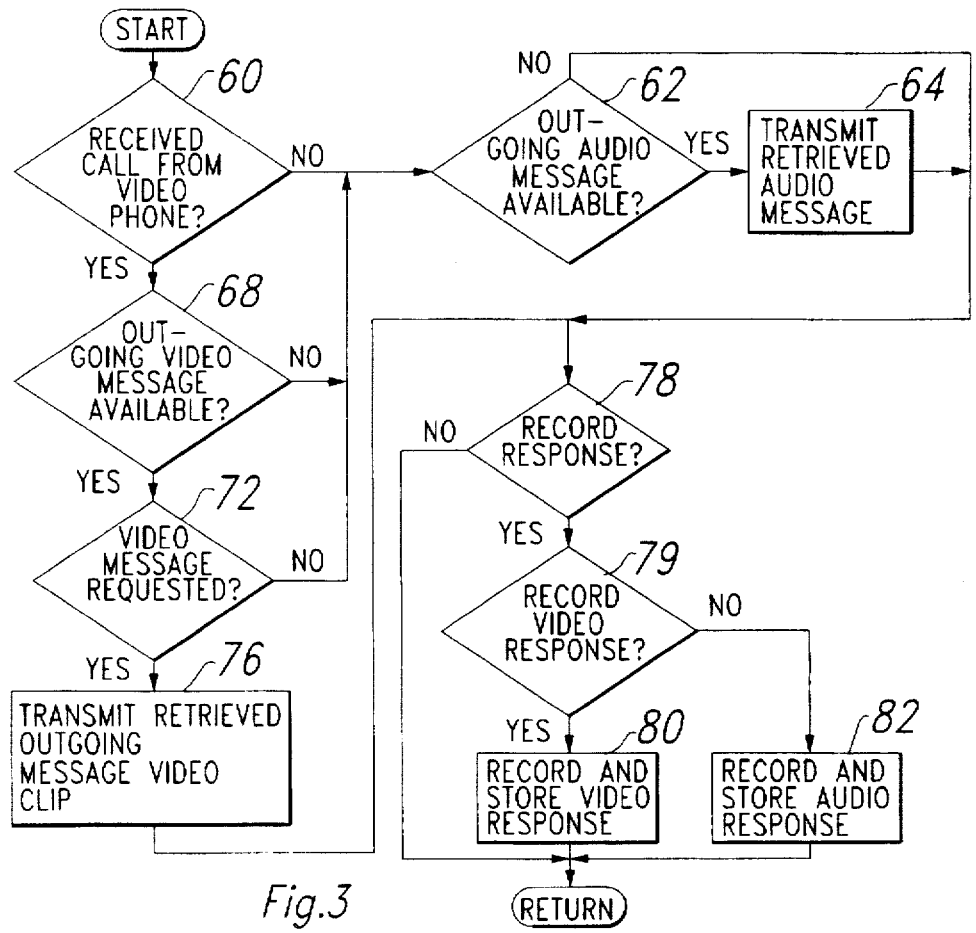
FIG. 3 illustrates operation of a call handler module in accordance with the present invention.

In addition to answering and processing incoming calls, the video answering machine in accordance with the present invention is operable to accept and process functional control codes. Thus, at decision block 36, if control codes are not received, processing continues at block 38 where control is transferred to a call handler, the operation of which is shown in FIG. 3 and discussed herenbelow. If, however, conemo odes are received at decision block 36, processing continues at decision block 40. The possible control codes include a message playback control code and a record outgoing message control code.

At decision block 40, if the message playback control code is received, and if, at decision block 46, the control module 12 determined that the incoming call was received from a video-capable device, processing continues at decision block 48. At decision bock 48, the caller is given the option to receive video playback of recorded messages. This gives the caller the ability to review the recorded messages in private, for security or for time-saving reasons. For examples although the caller is at a video-capable device, the video-capable device may also be viewable by other persons. Or, the video portion of the video-capable device may be inoperable. Thus, at decision block 48, if video playback is requested, operation continues at block 50 where the recorded messages are retrieved and transmitted to the caller for playback on the video-capable device.

If, at decision block 46, the incoming call is not received from a video-capable device or if, at decision block 48, although the device type indicates a video-capable device, video playback is not requested, operation continues at block 52 where only the audio portion of the recorded messages are retrieved and transmitted. Operation then continues at decision block 54 to continue processing other control codes if necessary.

If, at decision block 40, the control code was not the message playback control code, operation continues at decision block 42. It, at decision block 42, the received control code is a record outgoing message control code, and if, at decision block 56, the device type from which the control code was received. Indicates a video-capable device, operation continues at decision block 58. At decision block 58, although the received call is from a video-capable device, the caller is given the option of recording an audio only message. Thus, if, at decision block 58, the caller chooses to record a video message, operation continues at block 60 where the video message is recorded and stored.

If, at decision block 56, the device type indicates a non-video capable device or if, at decision block 58, the caller elects not to record a video messages operation continues at block 62 where an audio message is recorded and stored.

FIG. 3 is another flow diagram which illustrates operation of the call handling function with the control module 12. As shown at decision block 60, if the incoming call is received from a video-capable device, operation continues to decision block 68 where, if an outgoing video message is available, and if, at decision block 72, a video message is requested, control continues to block 76 where the outgoing video message is retrieved and transmitted.

If, at decision block 78, the caller elects to record a response, as discussed hereinabove, the caller is given the option at decision block 79 to record a video response, even is calling from a video-capable device, for privacy, security and/or time-saving reasons. If a video response is elected at decision block 79, control continues to block 80 where the video response is recorded and stored. Otherwise, an audio response is recorded and stored at block 82. If no response is chosen at decision block 78 or after recording and storing the audio or video response, operations terminate.

Returning to decision block 60, if the calling device is not a video-capable device, or if, at decision block 68, an outgoing video message is not available, or if, at decision block 72, a video message is not requested, operation continues a decision block 62. If, at decision block 62, an outgoing audio message available, the outgoing video message is retrieved and transmitted at block 64. Otherwise, operation continues at decision block 78 as disclosed hereinabove.

Returning to FIG. 1, included in the structure illustrated is a data compression module 14 and a data depression module 16. These modules are used to compress and decompress, respectively, both video and audio data for storage and for transmission to the calling device. The audio data player 20 is operable to playback audio data through the speaker 21. The video data player 24 is operable to playback video data on the display 25. The audio data recorded 22 controls recording of audio data retrieved through the microphone 23. The video data recorder 26 controls recording of video data retrieved through the camera 27. The data storage 19 is used for long term storage data including the audio and video data discussed hereinabove. The memory 18 serves as short-term storage data including the audio and video data discussed hereinabove.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A video answering machine comprising:

video data recording means, responsive to a controller means, for accepting and recording an outgoing video message;

audio data recording means, responsive to said controller means, for accepting and recording an outgoing audio message;

data storage means, responsive to said controller means, for storing said outgoing video message and said outgoing audio message;

said controller means for accepting an incoming call from a caller, for determining the device type associated with said incoming call, for responding to said incoming call using either said outgoing video message or only said outgoing audio message in accordance with said associated device type and for accepting either an audio only response or video response from said caller in accordance with said associated device type;

said data storage means, responsive to said controller means, for storing said audio response and said video response;

video data player means, responsive to said controller means, for retrieving and playing said outgoing video message; and audio data player means, responsive to said controller means, for retrieving and playing said outgoing audio message;

wherein said controller means further includes control code processor means for detecting and processing control codes received from said caller;

wherein said control code processor means includes change outgoing message means, responsive to said control codes and said associated device type determined by the control codes, for accepting either a new outgoing audio only message or a new outgoing video message form said caller; said data storage means, responsive to said controller means, for storing said new outgoing audio message and said new outgoing video message from said caller.

2. The system of claim 1 wherein said control code processor means includes message playback means, responsive to said control codes and said associated device type determined by the control codes, for retrieving and transmitting either said audio response only or said video response to said caller.

3. The system of claim 1 further including data compression means, responsive to said controller means, for compressing said outgoing video message or said outgoing audio message or said audio response or said video response to generate compressed data before storage.

4. The system of claim 1 further including data decompression means, responsive to said controller means, for decompressing said compressed data retrieved from said data storage.

5. A video answering machine comprising:

video data recording means, responsive to a controller means, for accepting and recording an outgoing video message;

audio data recording means, responsive to said controller means, for accepting and recording an outgoing audio message;

data storage means, responsive to said controller means, for storing said outgoing video message and said outgoing audio message;

said controller means for accepting an incoming call from a caller, for determining a device type associated with said incoming call, for responding to said incoming call using either said outgoing video message or only said outgoing audio message in accordance with said associated device type and for accepting either an audio only response or a video response from said caller in accordance with said associated device type;

said controller means includes control code processor means for detecting and processing control codes received from said caller;

said control code processor means includes message playback means, responsive to said control codes and said associated device type determined by the control codes, for retrieving and transmitting either said audio response only or said video response to said caller;

said control code processor means includes change outgoing message means, responsive to said control codes and said associated device type determined by the control codes, for accepting either a new outgoing audio only message or a new outgoing video message from said caller; said data storage means, responsive to said controller means, for storing said new outgoing audio only message and said new outgoing video message from said caller;

said data storage means, responsive to said controller means, for storing said audio response and said video response;

video data player means, responsive to said controller means, for retrieving and playing said outgoing video message; and audio data player means, responsive to said controller means, for retrieving and playing said outgoing audio message.

6. A video answering machine comprising:

video data recording means, responsive to a controller means, for accepting and recording an outgoing video message;

audio data recording means, responsive to said controller means, for accepting and recording an outgoing audio message;

data storage means, responsive to said controller means, for storing said outgoing video message and said outgoing audio message;

said controller means for accepting an incoming call from a caller, for determining a device type associated with said incoming call, for responding to said incoming call using either said outgoing video message or only said outgoing audio message in accordance with said associated device type and for accepting either an audio only response or a video response from said caller in accordance with said associated device type;

said controller means includes control code processor means for detecting and processing control codes received from said caller;

said control code processor means includes message playback means, responsive to said control codes and said associated device type determined by the control codes, for retrieving and transmitting either said audio response only or said video response to said caller;

data compression means, responsive to said controller means, for compressing said outgoing video message or said outgoing audio message or said audio response or said video response to generate compressed data before storage;

data decompression means, responsive to said controller means, for decompressing said compressed data retrieved from said data storage;

said data storage means, responsive to said controller means, for storing said audio response and said video response;

video data player means, responsive to said controller means, for retrieving and playing said outgoing video message; and audio data player means, responsive to said controller means, for retrieving and playing said outgoing audio message.

* * * * *